(12) United States Patent
Nagata et al.

(10) Patent No.: US 7,095,573 B2
(45) Date of Patent: Aug. 22, 2006

(54) IMAGE PICKUP APPARATUS

(75) Inventors: Tetsuo Nagata, Hachioji (JP); Tomoko Sato, Hachioji (JP); Akihiro Sakurai, Hino (JP); Tetsuya Ishii, Hachioji (JP); Takeshi Takahashi, Hachioji (JP); Kazuhiro Matsumoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 16 days.

(21) Appl. No.: 10/909,558

(22) Filed: Aug. 3, 2004

(65) Prior Publication Data
US 2005/0146801 A1 Jul. 7, 2005

(30) Foreign Application Priority Data
Aug. 8, 2003 (JP) .............................. 2003-290489

(51) Int. Cl.
G02B 7/02 (2006.01)
(52) U.S. Cl. ...................... 359/811; 359/819; 359/822
(58) Field of Classification Search ................ 359/811, 359/813, 814, 819, 821, 822, 823
See application file for complete search history.

(56) References Cited

U.S. PATENT DOCUMENTS 6,650,483 B1 11/2003 Uehara et al. .............. 359/631
6,704,052 B1 * 3/2004 Togino et al. .............. 348/340

FOREIGN PATENT DOCUMENTS

JP 11-326766 11/1999
JP 2001-27704 1/2001

* cited by examiner

Primary Examiner—Timothy Thompson
(74) Attorney, Agent, or Firm—Kenyon & Kenyon LLP

(57) ABSTRACT

An image pickup apparatus comprises one holding component which holds two or more prisms and an image pickup element. As for the holding component, a prism holding portion and an image pickup element holding portion are formed in one component. At the prism holding portion, an opening is formed. At the image pickup element, the image pickup element holding portion is fixed. Each prism is fixed to the holding component from the both sides of the holding component by fitting a projected portion into a penetration hole, respectively.

17 Claims, 18 Drawing Sheets

US 7,095,573 B2

IMAGE PICKUP APPARATUS

This application claims priority to Japanese Patent Application No. 2003-290489 filed 8 Aug. 2003, the content of which is incorporated herein by reference in its entirety.

BACKGROUND OF THE INVENTION

1. Field of the Invention

The present invention relates to an image pickup apparatus, particularly, an image pickup apparatus, such as a video camera, a digital still camera, a film scanner, an endoscope, etc., which has a decentering optical system having power at a reflecting surface in the optical apparatus using a small image pickup element.

2. Description of the Related Art

Recently, in an image forming optical system for a video camera, a digital still camera, a film scanner, an endoscope, etc., an achieving small-sizing, weight-lightening and low cost as for the optical system itself have been demanded with development of miniaturization of an image pickup element.

Furthermore, recently, a product which contains an electronic imaging optical system in a cellular phone, PDA, a notebook PC, etc. has also come out, and more thinning of the optical system has been desired strongly.

An attachment device in which two or more prism optical systems using a free curved surface etc. are attached in an image pickup element has been conventionally proposed in order to make the optical system thin.

In a conventional example, it has been disclosed that while holding a piece of attachment arranged on the sides of two prisms via a screw to a rod shape component, this rod shape component is fixed to a fixing bracket, and a structure for fixing the fixing bracket which fixes the rod shape component to another fixing bracket, wherein CCD is fixed to the another fixing bracket.

SUMMARY OF THE INVENTION

The image pickup apparatus according to the present invention has one holding component for holding two or more prisms and an image pickup element.

The image pickup apparatus according to the present invention is composed only of a prism holding component for holding two or more prisms, and an image pickup element holding component for holding the image pickup element.

The image pickup apparatus according to the present invention is composed such that the prism holding component is composed so as to be movable to the image pickup element holding component.

According to the present invention, an image pickup apparatus where positions of two or more prisms to an aperture stop, and a position of the image pickup element to whole optical system including the aperture stop are guaranteed with high precision can be obtained.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
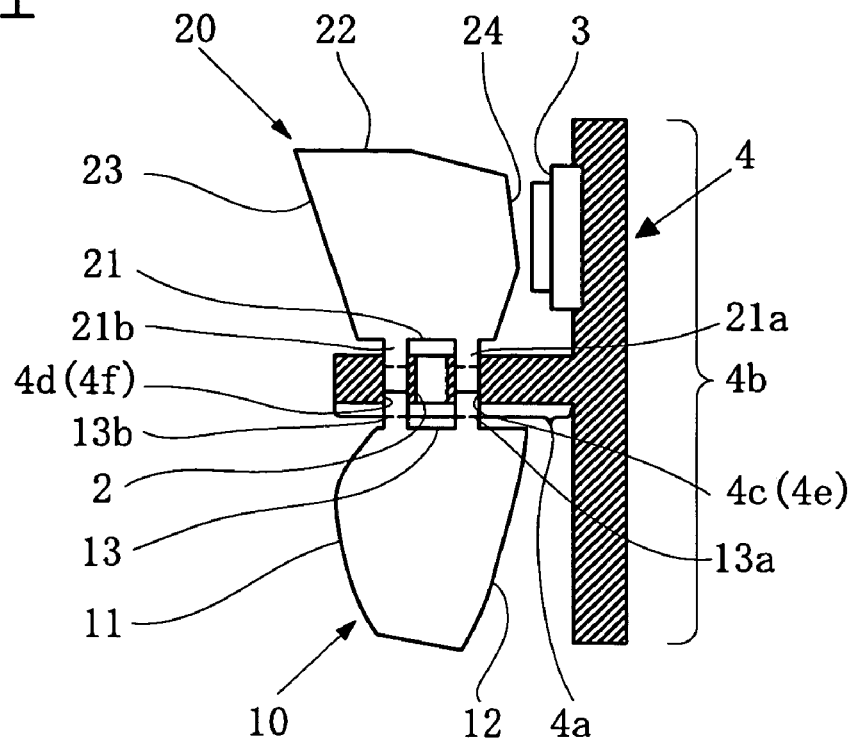
FIG. 1 is a sectional view showing an outline composition of an image pickup apparatus of a first embodiment according to the present invention.

Prior to explanation of embodiments, effects and actions according to the composition of the present invention will be explained.

According to the image pickup apparatus of the present invention, two or more prisms and an image pickup element are held by one or two holding components. Therefore, an optical system can be assembled with highly precision. By arranging an aperture stop mechanism on the holding component, the holding component having aperture stop function is positioned with high precision to the image pickup element. By such composition, positions of two or more prisms to the aperture stop, and a position of the aperture stop to the whole optical system including the aperture stop can be guaranteed with high precision, by simple construction and with a small number of parts. In that case, if the holding component having aperture stop function also holds an image pickup element, the optical system having the image pickup element and two or more optical components can be held by least number of holding component as much as possible, and accordingly the position of each optical component can be guaranteed with high precision.

It is desirable that a prism holding component and an image pickup element holding component is formed one. That is, it means that a border surface does not exist between the prism holding component and the image pickup element holding component. Position of the prism holding component may be fixed on the image pickup element holding component. That is, it means that the prism holding component and the image pickup element holding component are components which are independent respectively, and these components are fixed via a connection portion.

Moreover, in the image pickup apparatus of the present invention, it can be composed such that a prism holding component is movable to an image pickup element holding component. In this case, it is composed such that a movable frame is formed in one on the prism holding component, and a holding axis which holds the prism holding component so as to enable to move along the direction of incident light toward the image pickup element via the movable frame is formed in one on the image pickup element holding component. By such composition, it is possible to have an arrangement where the center of gravity and holding component of the whole optical system are closely placed, and accordingly the posture, as a whole, of two or more prisms and the image pickup element can be stabilized. Depending upon case, as for the quality of the material of a holding axis, different quality of the material from the quality of the material of an image pickup element holding component can be used. In this case, the image pickup element holding component cannot be formed in one. However, since the intensity of the holding axis can be raised, the prism holding component can be moved in stable state.

Furthermore, if it is composed such that the movable frame is formed at a side which does not face an entrance surface of the image pickup element in the prism holding component, thickness of the direction of incident light to the image pickup element in an image pickup apparatus can be made thin.

The First Embodiment

FIG. 1 is a sectional view showing an outline composition of an image pickup apparatus of a first embodiment according to the present invention. The image pickup apparatus of the first embodiment has a first prism 10, an aperture diaphragm 2, a second prism 20, an image pickup element 3, and a holding component 4. The first prism 10 has an entrance surface 11 and a rotationally asymmetric reflective surface 12 and an exit surface 13. The second prism 20 has an entrance surface 21, reflective surfaces 22 and 23, and an exit surface 24. At least one surface of reflecting surfaces 22 and 23 is composed of a rotationally asymmetric reflecting surface. This rotationally asymmetric surface has only one symmetric surface. As for the exit surface 13 of the first prism 10, projected portions 13a and 13b are formed in one at the outside area of an effective diameter.

As for the holding component 4, a prism holding portion 4a and an image pickup element holding portion 4b are composed in one. The aperture stop 2 is formed in prism holding portion 4a. The image pickup element 3 is fixed to the image pickup element holding portion 4b. The penetration holes 4c and 4d in which the projected portions 13a and 13b of the first prism 10 can be fitted, and the penetration holes 4e and 4f in which the projected portions 21a and 21b of the second prism 20 can be fitted are formed in the prism-holding-portion 4a. In addition, penetration holes 4c and 4d and penetration holes 4e and 4f are formed at the different positions of the prism holding portion 4a. In FIG. 1, penetration holes 4c and 4d are shown, but penetration holes 4e and 4f are hidden in the inner portion of penetration holes 4c and 4e. The first prism 10 and the second prism 20 are fixed to the holding component 4 from the both sides of a holding component 4 by fitting projected portions 13a and 13b into penetration holes 4c and 4d, and projected portions 21a and 21b into penetration holes 4e and 4f, respectively.

Thus, in the image pickup apparatus of the first embodiment composed in this way, the holding component which holds two or more prisms 10 and 20 and image pickup elements 3 is composed as one component. Therefore, since a small number of parts are used, a setting-up error in assembling holding components like the conventional composition does not arise. Moreover, as the less error is generated, the higher precise fixing of positions of an aperture stop, a prism and an image pickup element in an optical apparatus can be attained.

The Second Embodiment

Figure 2:
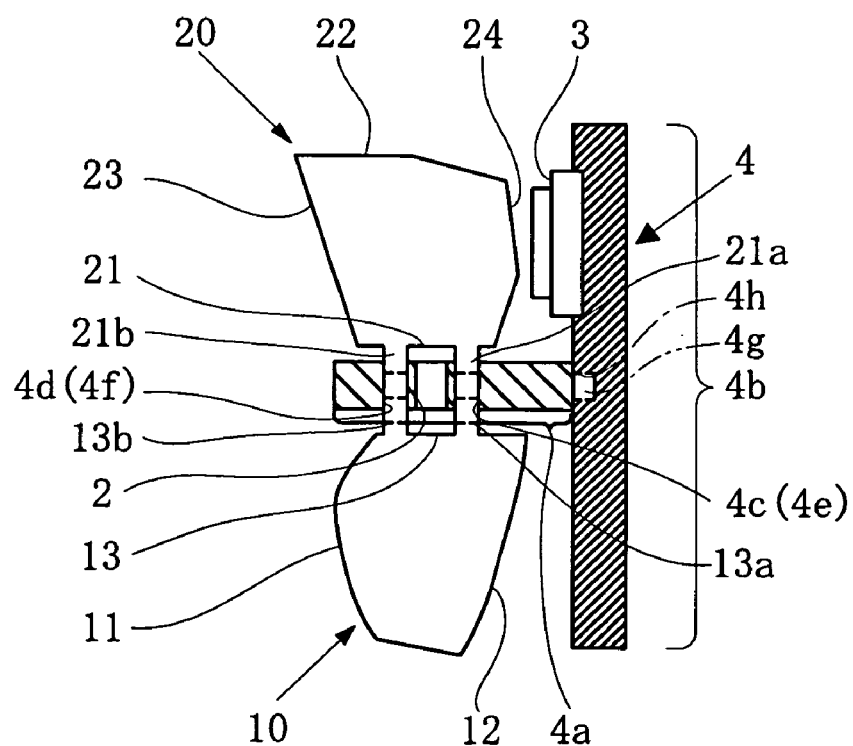
FIG. 2 is a sectional view showing an outline composition of an image pickup apparatus concerning a second embodiment according to the present invention.

FIG. 2 is s sectional view showing an outline composition of an image pickup apparatus concerning a second embodiment according to the present invention. In the image pickup apparatus of the second embodiment, a prism-holding-portion 4a and an image pickup element holding portion 4b of a holding component 4 are formed separately, and an end portion 4g of the prism holding portion 4a is fixed by being fitted into a holding portion receiving portion 4h of the image pickup element holding portion 4b. Other compositions are almost the same as the first embodiment.

Thus, in the image pickup apparatus of embodiment, the holding component which holds two or more prisms 10 and 20 and image pickup elements 3 is composed of two components. Therefore, compared with the conventional holding structure, it is composed by fewer components. Therefore, as the fewer components are used, the more assembly error decreases, and accordingly the higher precise fixing of positions of an aperture stop, a prism and an image pickup element in an optical apparatus can be attained.

The Third Embodiment

Figure 3:
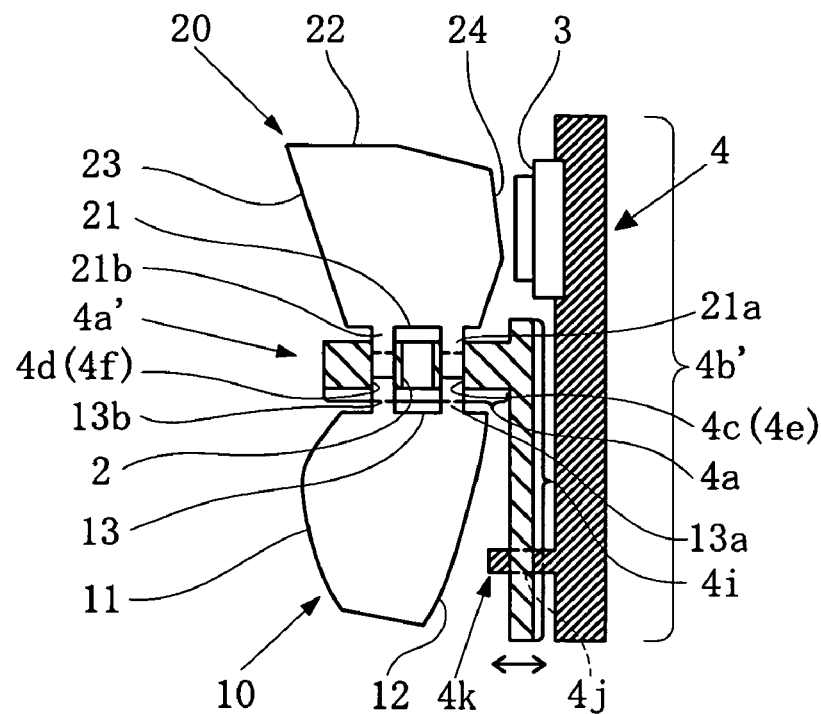
FIG. 3 is a sectional view showing an outline composition of an image pickup apparatus concerning a third embodiment according to the present invention.

FIG. 3 is sectional view showing an outline composition of an image pickup apparatus concerning the third embodiment according to the present invention. In the image pickup apparatus of a third embodiment, a prism holding component 4a' of a holding component 4 and an image pickup element holding portion 4b' are composed separately. In the prism holding component 4a', a prism holding portion 4a and a movable frame 4i are formed in one. A predetermined penetration hole 4j is formed in the movable frame 4i. In the image pickup element holding portion 4b', a holding axis 4k having a diameter which is formed so as to fit loosely in the penetration-hole 4j formed in the movable frame 4i is formed in one. The holding axis 4k of the image pickup element holding portion 4b' is fitted loosely in the penetration hole 4j of the movable frame 4i. The prism holding component 4a' is held movably along the direction of an incident light toward an image pickup element 3 to the image pickup element holding component 4b' (that is, to the directions marked by arrow heads⇆shown in FIG. 3). Other compositions are almost the same as the first embodiment.

Thus, in the image pickup apparatus of the third embodiment composed in such way, the prism holding component 4a' is moved toward the direction of entrance of the light toward the image pickup element 3 to image pickup element holding component 4b' through the movable frame 4i and the holding axis 4k. Thereby, the center of gravity of the whole optical system can approach the holding position of the image pickup element of the holding component. If the prism is designed so that a light path length from the prism to the image pickup element at such closely approached position becomes optimal, the arrangement in which the center of gravity of the whole optical system and the holding component are closely located can be obtained, and the posture of two or more prisms and the image pickup element, as a whole, can be stabilized. Other composition, function and effect are almost the same as those of the second embodiment.

The holding-axis 4k and the image pickup element holding portion 4b' can be formed separately. Moreover, the holding-axis 4k can be composed of a materials having high intensity. By such composition, the prism-holding-component 4a' can be moved in stabilized state, since the intensity of holding-axis 4k can be raised.

The Fourth Embodiment

Figure 4:
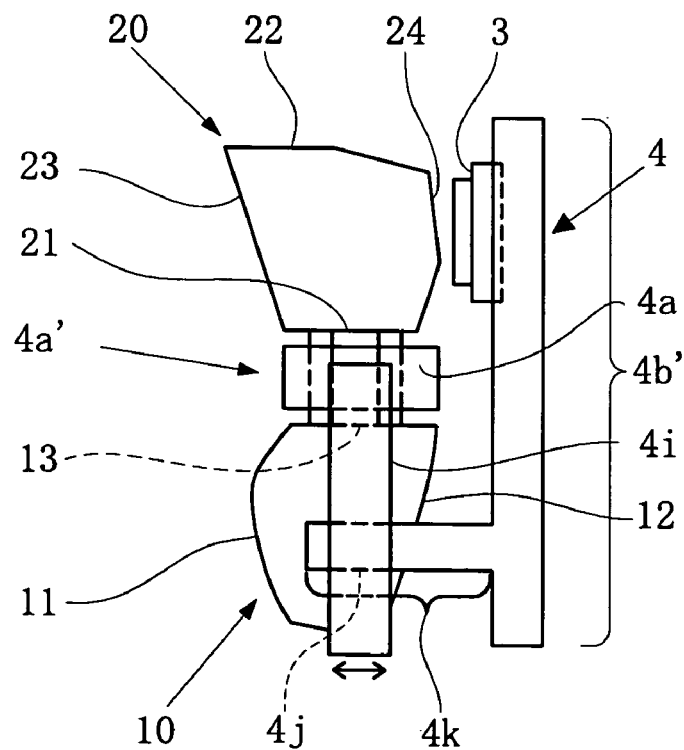
FIG. 4 is a side elevation showing an outline composition of an image pickup apparatus concerning a fourth embodiment according to the present invention.

FIG. 4 is a side elevation showing an outline composition of an image pickup apparatus concerning the fourth embodiment according to the present invention. In the image pickup apparatus of the fourth embodiment, a movable frame 4i is formed on a side of a prism holding component 4a', which does not face an entrance surface of an image pickup element 3. In the image pickup apparatus of the fourth embodiment composed in this way, thickness of the direction of entrance of the light to the image pickup element 3 in an image pickup apparatus can be made thin. Other composition, function and effect are almost the same as those of the third third embodiment.

By the way, the decentering prism arranged at both sides of the aperture stop of the present invention is not limited to a decentering prism in which the number of times of internal reflection is one or two times as shown in FIG. 1 or 4. For example, well-known, various decentering prisms in which the number of times of internal reflection is two times or more can be used. An example is shown below. It will be explained by using a forward ray tracing. In this case, the decentering prism P forms an image of an object located at a distant point on an image surface 136 through a pupil 131. However, by making the optical path reverse, it can be used also as a decentering prism P in which light enters from the side of the image surface 136 and forms an image at the side of the pupil 131.

Figure 5:
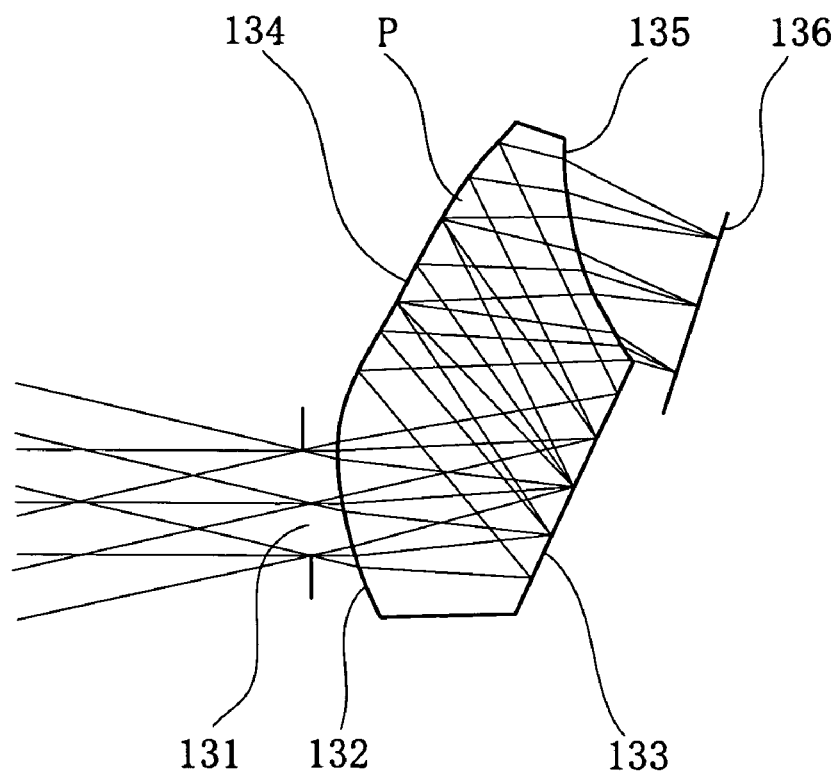
FIG. 5 is a diagram showing a modified example of a decentering prism which is used in the image pickup optical system according to the present invention.

In case of FIG. 5, the decentering prism P has the first surface 132 and the second surface 133 and the third surface 134 and the fourth surface 135. An incident light through the incidence pupil 131 is refracted by the first surface 132, enters the decentering prism P, and an internal reflection occurs at the second surface 133. Then, this light is internally reflected at the third surface 134 so as to form an optical path of Z letter shape, and it enters the fourth surface and refracted at it, and then forms an image on the image surface 36.

Figure 6:
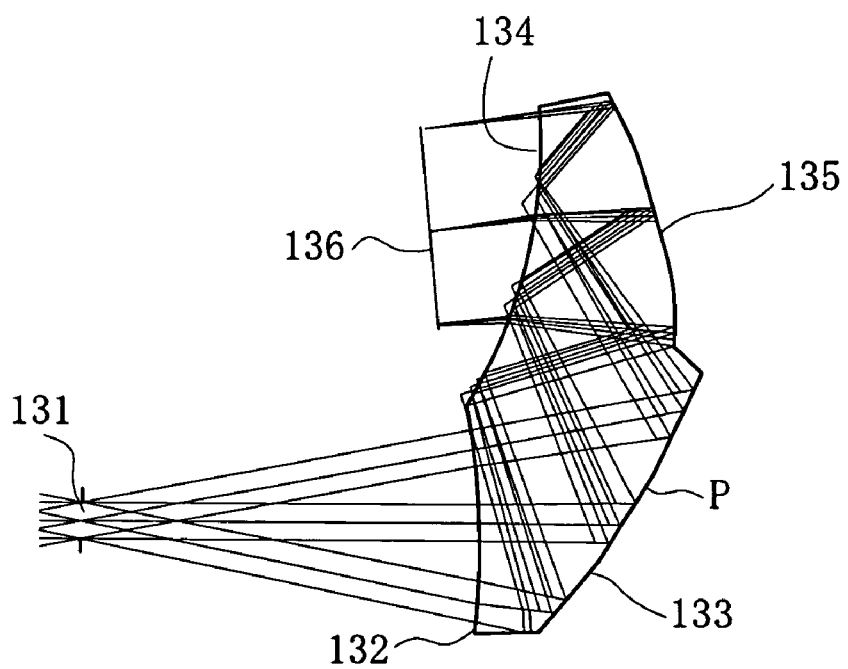
FIG. 6 is a diagram showing another modification of a decentering prism.

In case of FIG. 6, the decentering prism P has the first surface 132 and the second surface 133 and the third surface 134 and the fourth surface 135. An incident light through the incidence pupil 131 is refracted by the first surface 132, enters the decentering prism P, and an internal reflection occurs at the second surface 133. Then, this light enters the third surface 134 where a total internal reflection occurs, and it enters the fourth surface 135 where an internal reflection occurs. Furthermore, this light enters again the third surface 134, where it is refracted and an image is formed on the image surface 36.

Figure 7:
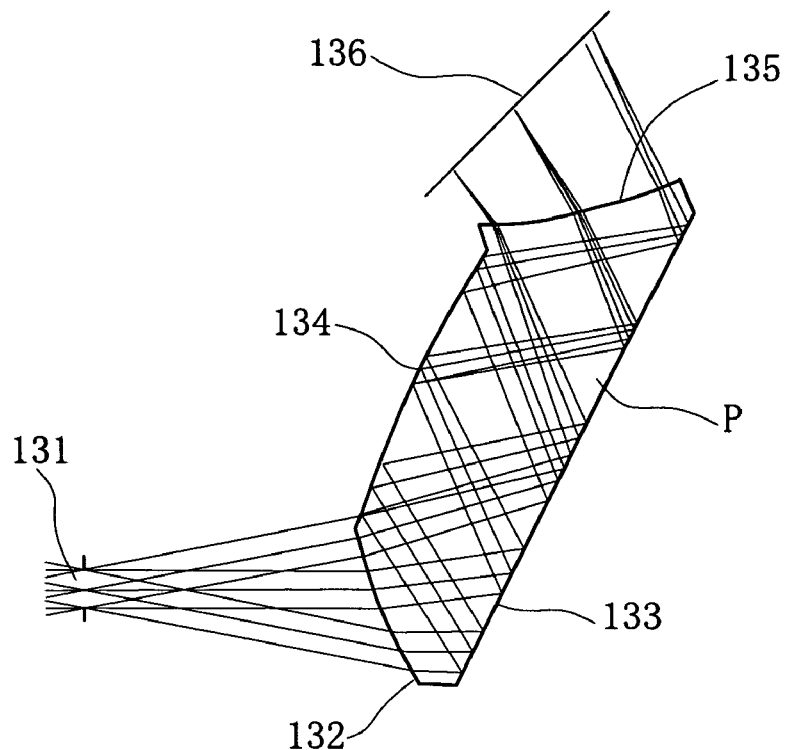
FIG. 7 is a diagram showing still more another modification of a decentering prism.

In case of FIG. 7, the decentering prism P consists of the first surface 132 and the second surface 133 and the third surface 134 and the fourth surface 135. An incident light through the incidence pupil 131 is refracted by the first surface 132, enters the decentering prism P, and an internal reflection occurs at the second surface 133. Then, this light enters the third surface 134, and it is internally reflected, and enters again the second surface 133 where an internal reflection occurs, and it enters the fourth surface 135 where it is refracted, and forms an image on the image surface 36.

Figure 8:
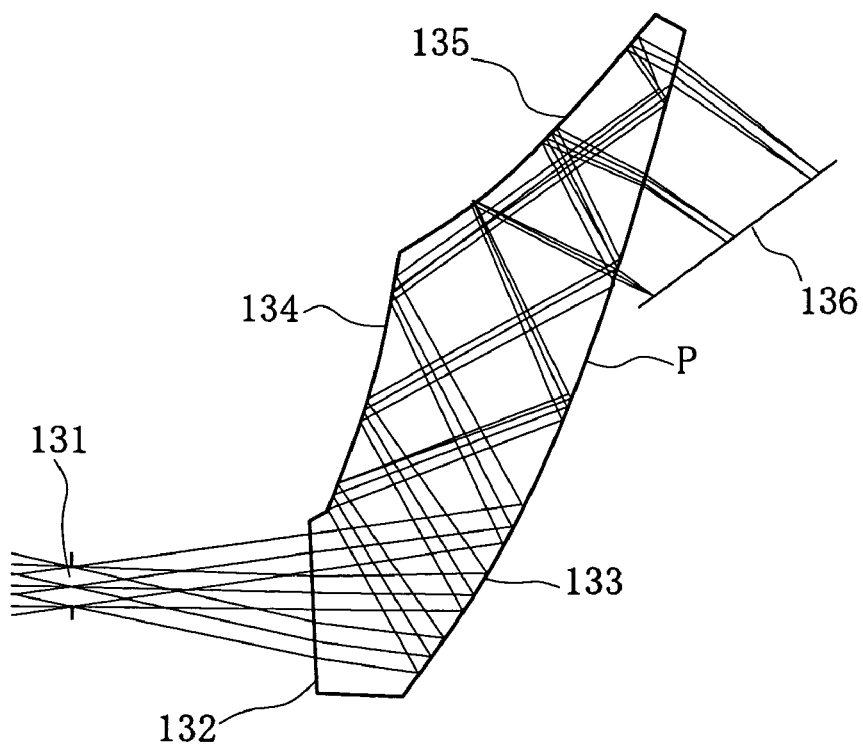
FIG. 8 is a diagram showing still more another modification of a decentering prism.

In case of FIG. 8, the decentering prism P has the first surface 132 and the second surface 133 and the third surface 134 and the fourth surface 135. An incident light through the incidence pupil 131 is refracted by the first surface 132, enters the decentering prism P, and an internal reflection occurs at the second surface 133. Then, this light enters the third surface 134, where an internal reflection is performed and it enters again the second surface 133, where an internal reflection occurs. Furthermore, this light enters again the fourth surface 135, where an internal reflection is made and then it is refracted and an image is formed on the image surface 36.

Figure 9:
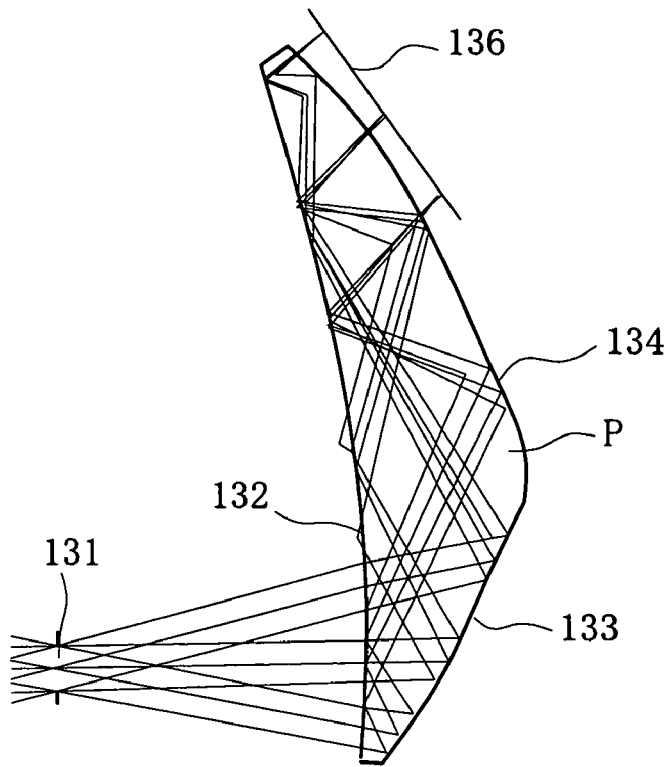
FIG. 9 is a diagram showing still more another modification of a decentering prism.

In case of FIG. 9, the decentering prism P has the first surface 132, the second surface 133 and the third surface 134. An incident light through the incidence pupil 131 is refracted by the first surface 132, enters the decentering prism P, and an internal reflection occurs at the second surface 133. Then, this light enters again the first surface 132, where and a total internal reflection occurs, and enters the third surface 134, where an internal reflection occurs. Furthermore, this light enters at three times the first surface 132, where a total internal reflection is made and then it enters again the third surface 134, where it is refracted, and an image is formed on the image surface 36.

Figure 10:
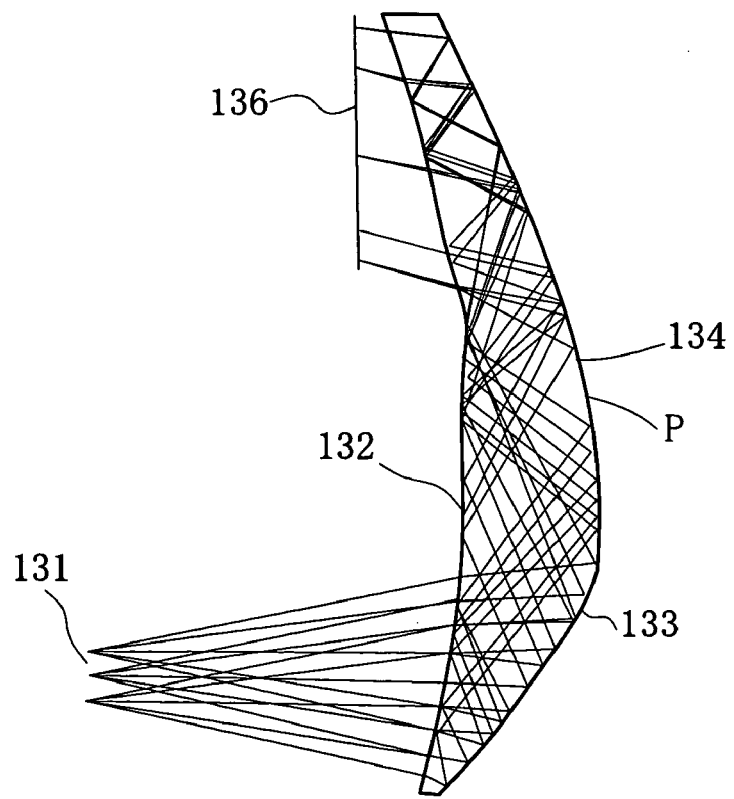
FIG. 10 is a diagram showing still more another modification of a decentering prism.
Figure 11:
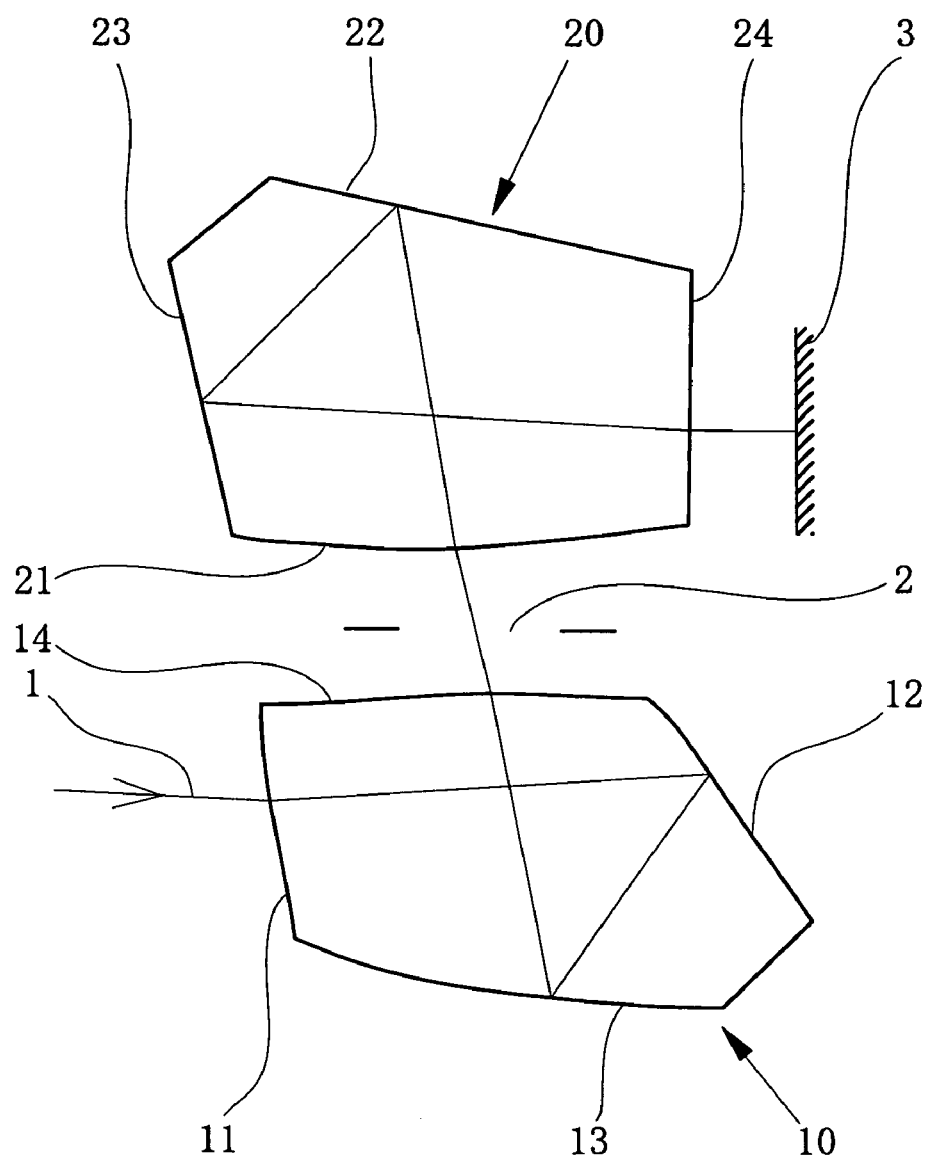
FIG. 11 is a diagram showing an example of an image pickup optical system which can be applied to a holding structure of the present invention which consists of combination of prisms different from those in the first embodiment to the fourth embodiment.

In case of FIG. 10, the decentering prism P has the first surface 132 and the second surface 133 and the third surface 134. Incident light passed through the incidence pupil 131 is refracted at the first surface 132, and enters the decentering prism P, and is internally reflected at the second surface 133. Then, it enters again the first surface 132, where a total internal reflection occurs and it is internally reflected at the third surface 134 and enters at third time the first surface 132, where a total internal reflection occurs. Then, it enters the third surface 134, where an internal reflection occurs, and it enters, at fourth time, the first surface 132, where it is refracted and forms an image on the image surface 36.

Figure 12:
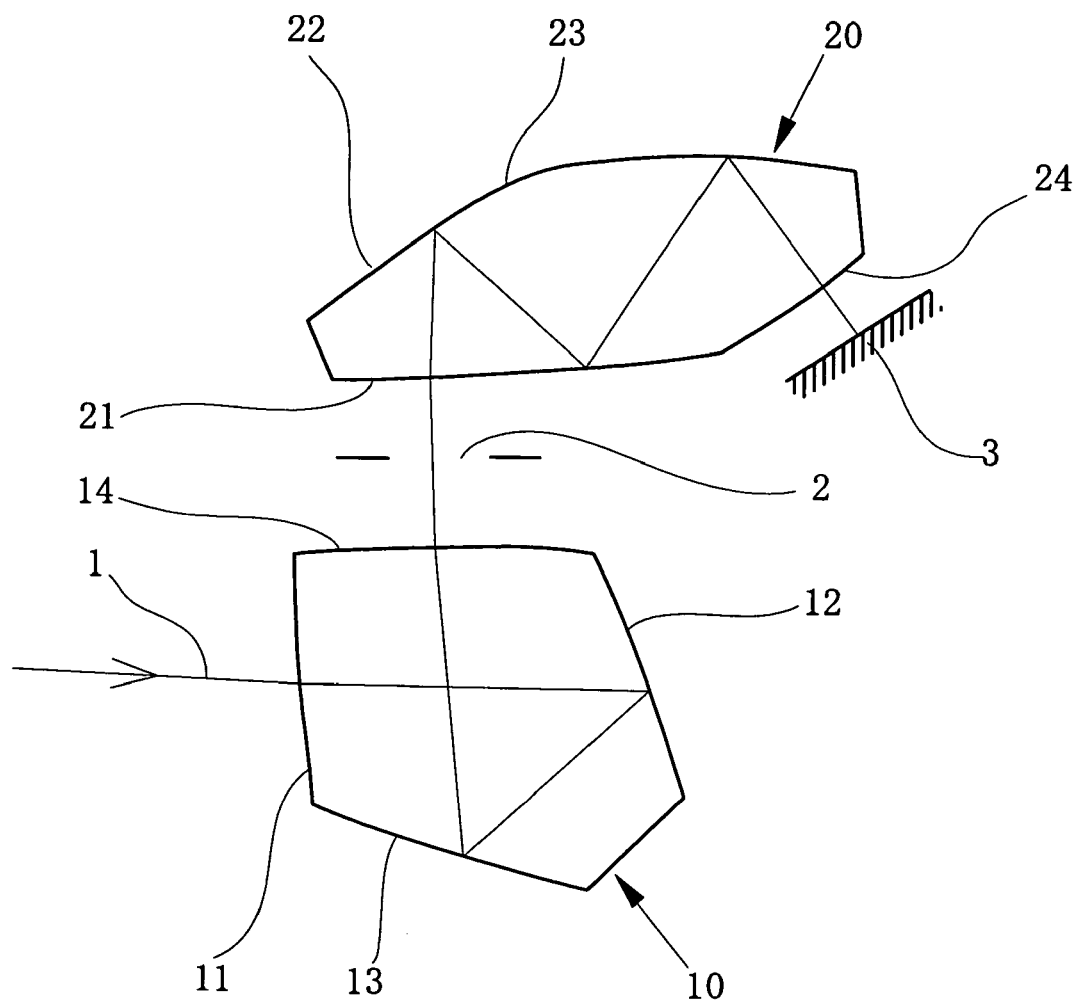
FIG. 12 is a diagram showing an example of an image pickup optical system which can be applied to a holding structure of the present invention which consists of combination of prisms different from those in the first embodiment to the fourth embodiment.
Figure 13:
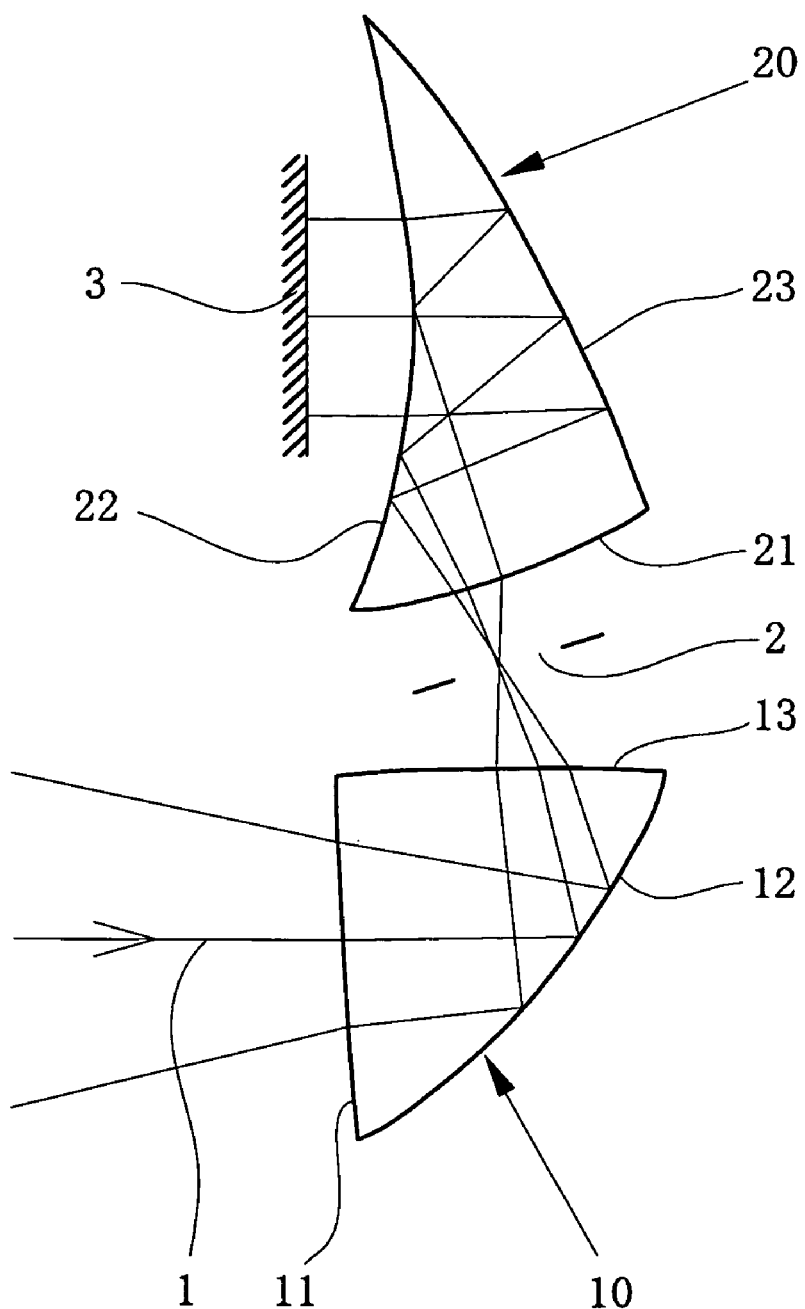
FIG. 13 is a diagram showing an example of an image pickup optical system which can be applied to a holding structure of the present invention which consists of combination of prisms different from those in the first embodiment to the fourth embodiment.
Figure 14:
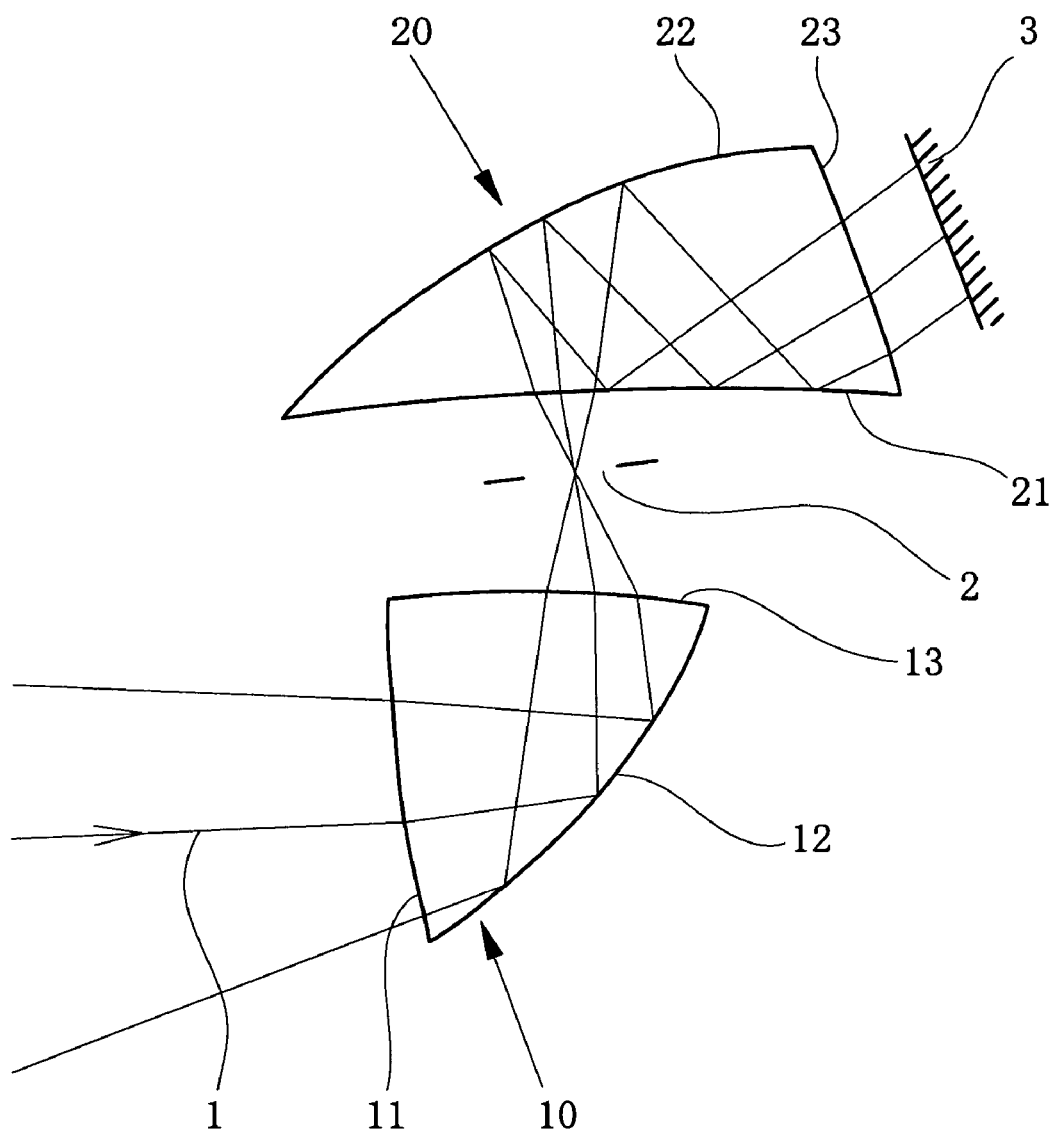
FIG. 14 is a diagram showing an example of an image pickup optical system which can be applied to a holding structure of the present invention which consists of combination of prisms different from those in the first embodiment to the fourth embodiment.
Figure 15:
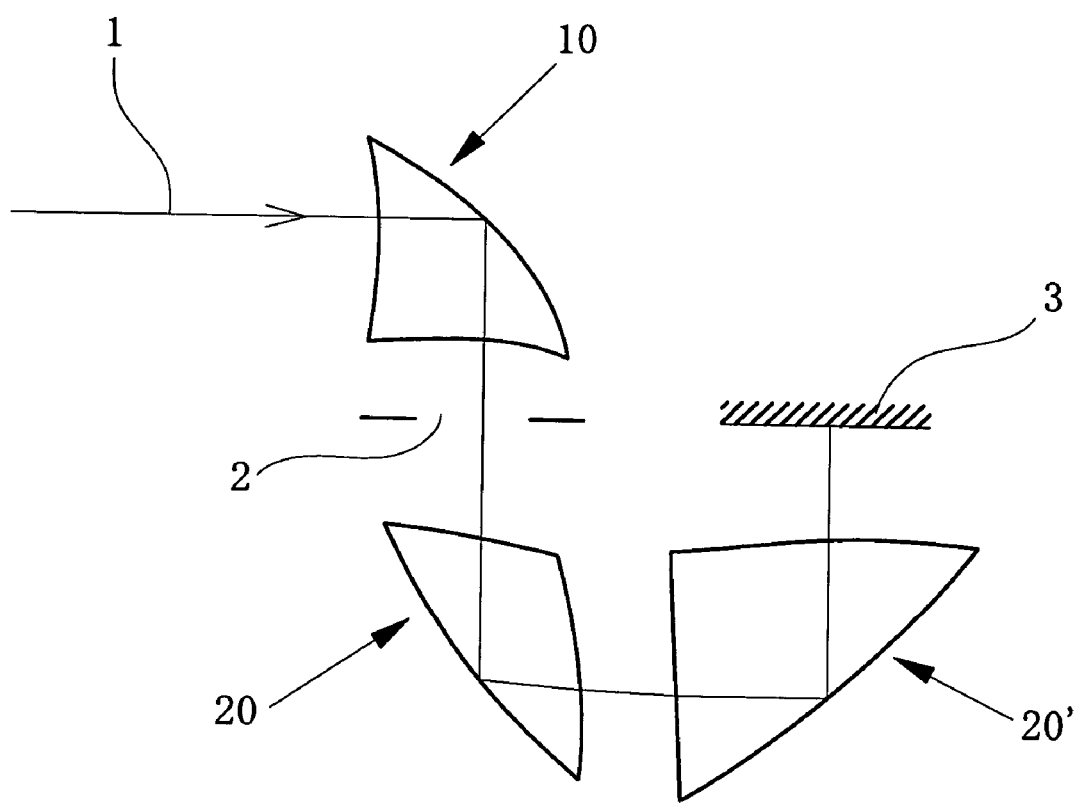
FIG. 15 is a diagram showing an example of an image pickup optical system which can be applied to a holding structure of the present invention which consists of combination of prisms different from those in the first embodiment to the fourth embodiment.

Furthermore, like the second prism 20 in FIG. 12 mentioned later, a decentering prism can be composed of a first surface 21 to a fourth surface 24, where three reflection occur in the prism. Or, like the second prism 20 in FIG. 13 mentioned later, it can be composed of a first surface 21 to a fourth surface 23, where two reflections are performed in a prism in which the second surface is used as a total internal reflection surface and as an exit surface, or, like the second prism 20 in FIG. 14 mentioned later, it can be composed of a first surface 21 to a third surface 23, where two reflections are performed in a prism in which the first surface 21 is used as an entrance surface and as a total internal reflection surface. These can be used as a decentering prism at before side or backside of an aperture 2.

FIGS. 11 to 15, show image pickup optical systems to which a holding structure of the present invention can be applied, where a combination of prisms is different from that in case of the first embodiment to the fourth embodiment can be applied. However, numerical data has been omitted.

An optical system mentioned above, to which a holding structure of the present invention is applicable, can be used for a photographing apparatus in which a photograph is taken by forming an object image and receiving the image on an image pickup element like CCD or a silver halide film, particularly, for a camera. It can be used for an observation apparatus for observing an object image through an eyepiece, particularly for an objective optical system of finder portion of a camera. Moreover, it can be used also as an image pickup optical system for an optical apparatus using a small-sized image pickup element, such as an endoscope. It can be used also as an image pickup optical system for optical apparatuses. The embodiments will be shown as follows.

Figure 16:
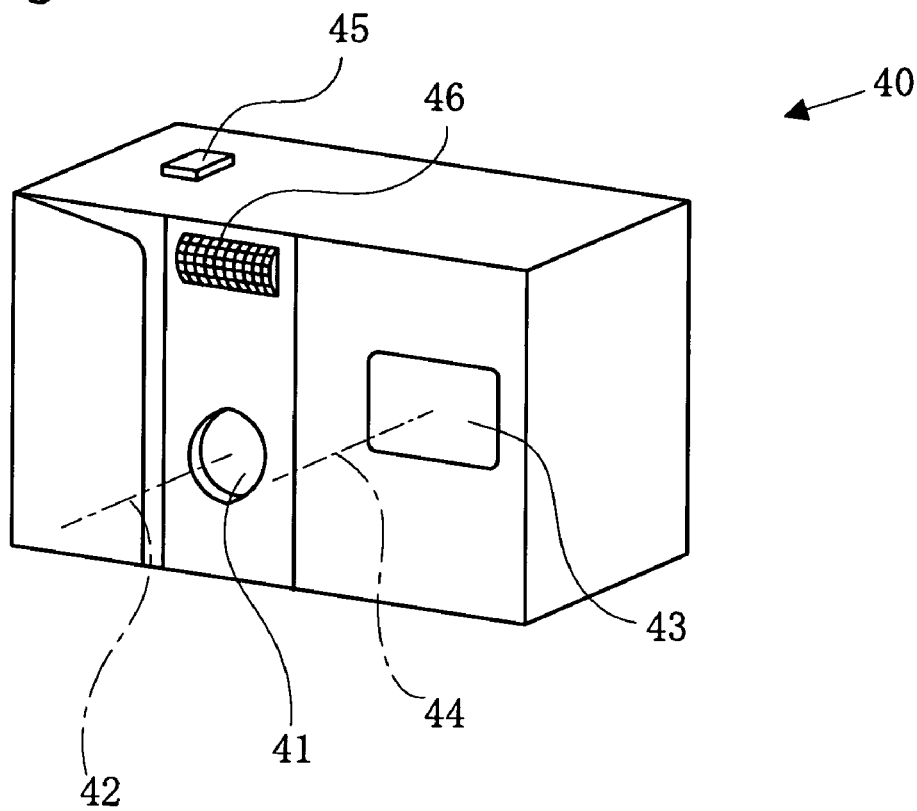
FIG. 16 is a front perspective diagram showing the external appearance of an electronic camera which uses the optical system in which the holding structure of the present invention can be applied.
Figure 17:
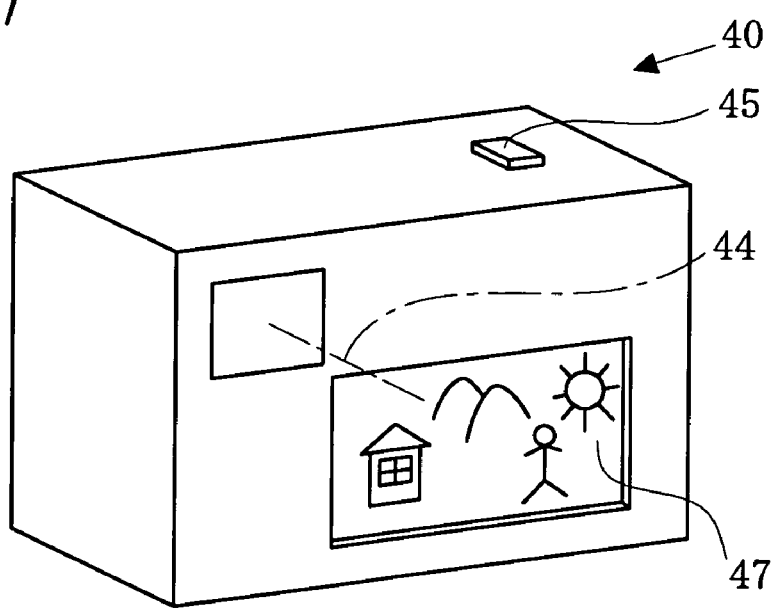
FIG. 17 is a rear perspective view of the electronic camera of FIG. 16.
Figure 18:
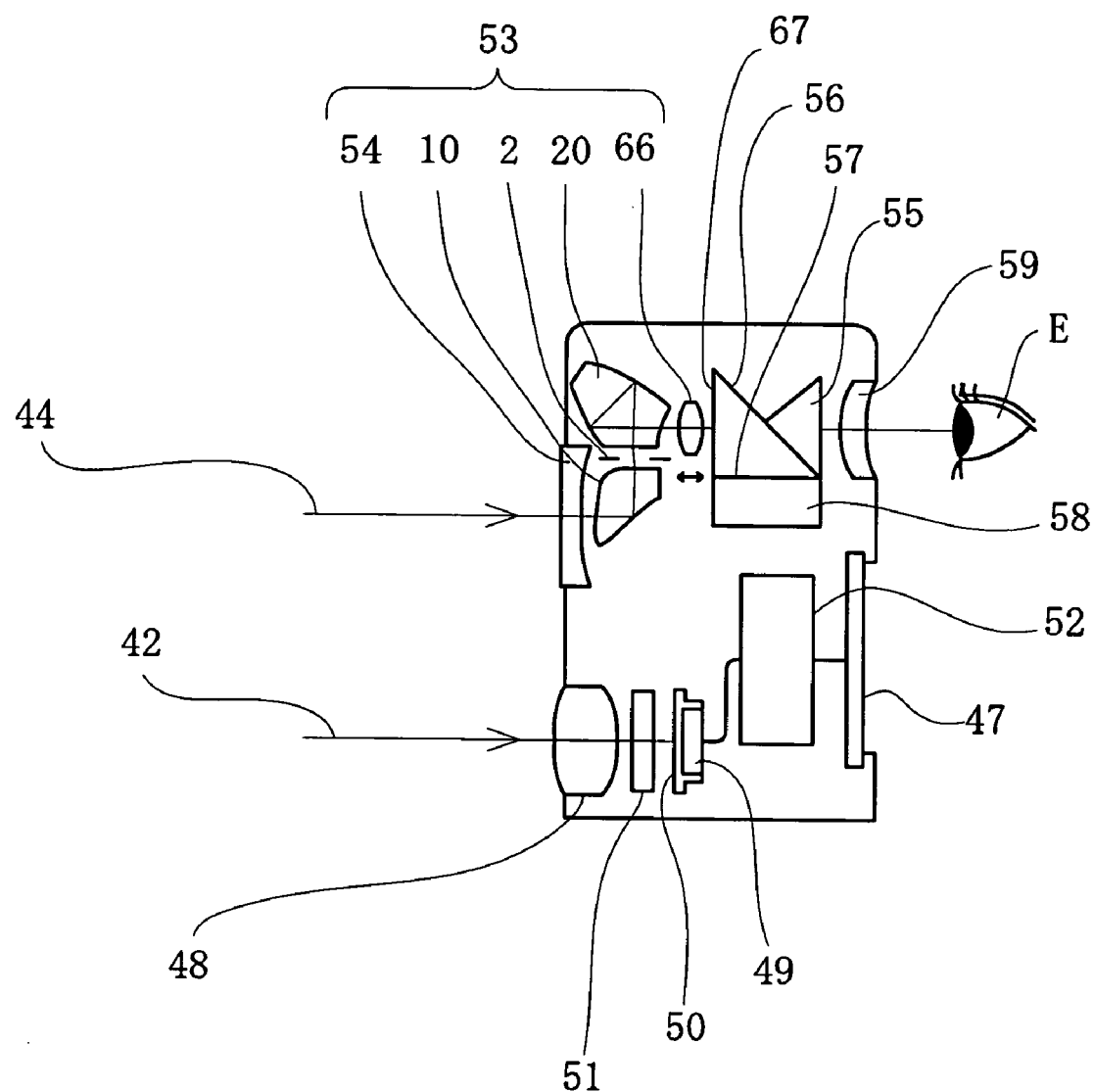
FIG. 18 is a sectional view of the electronic camera of FIG. 16.

FIGS. 16 to 18 are conceptual diagrams showing compositions in which a holding structure of the present invention is built in an objective optical system of a finder portion of an electronic camera. Diagram 16 is a front perspective diagram showing an external appearance of an electronic camera 40. Diagram 17 is a perspective view at backside of the same. Diagram 18 is a sectional diagram showing the composition of the electronic camera 40. In the case of this example, the electronic camera 40 contains a photographing optical system 41 having an optical path 42 for photographing, a finder optical system 43 having an optical path for a finder 44, a shutter button 45, a flash 46, and liquid crystal display monitor 47, etc. When the shutter button 45 arranged at the upper part of the camera 40 is pressed, by linking to it, photographing is performed through an objective optical system 48 for photographing. An object image formed by an objective optical system 48 for photographing is formed on an image pickup surface 50 of CCD 49 through a filter 51, such as a low pass filter and an infrared cut filter, etc. The object image received by this CCD 49 is displayed, as an electronic picture through a processing means 52, on a liquid crystal display monitor 47 on the camera back. On this processing means 52, memory and the like are arranged, and a photographed electronic picture can also be recorded. This memory can be arranged separately from the processing means 52 and it can be composed so that recording and writing may be done electronically by a floppy disk (registered trademark) etc. Moreover, it can be composed as a film-based camera using silver halide film instead of CCD 49.

Furthermore, on the optical path 44 for finder, the objective optical system 53 for finder is arranged. This objective optical system 53 for finders consists of a cover lens 54, a first prism 10, an aperture stop 2, a second prism 20, and a lens for focusing 66. Here, the optical system according to the present invention is used for the optical system from a cover lens 54, or the first prism 10 to the second prism 20. The cover lens 54 used as a cover component is a lens having negative power and a wide angle of view. Moreover, the lens 66 for focusing arranged behind the second prism 20, can be adjusted along the cross direction of the optical axis, and it is used for focus regulation of the objective optical system 53 for finder. The object image formed on an image forming surface 67 by this objective optical system 53 for finder is formed on a view frame 57 of Porro prism 55 which is a component for an erected image. The view frame 57 divides a first reflecting surface 56, and a second reflecting surface 58 of Porro prism 55, and is arranged between them.

In a camera 40 composed in this way, the objective optical system 53 for finder can be composed with a small number of optical component, and high performance and cost reduction can be achieved. Furthermore, since an optical path of the objective optical system 53 can be composed by bending the optical path itself, the degree of freedom of arrangement of inside of the camera increases and it becomes advantageous for designing.

In the composition of diagram 18, no reference has been made about the composition of the objective optical system 48 for photographing. However, as a matter of course, it is also possible to use any type of optical system which consists of two prisms 10 and 20 according to the present invention besides a refracted type coaxial optical system as an objective optical system 48 for photographing.

Figure 19:
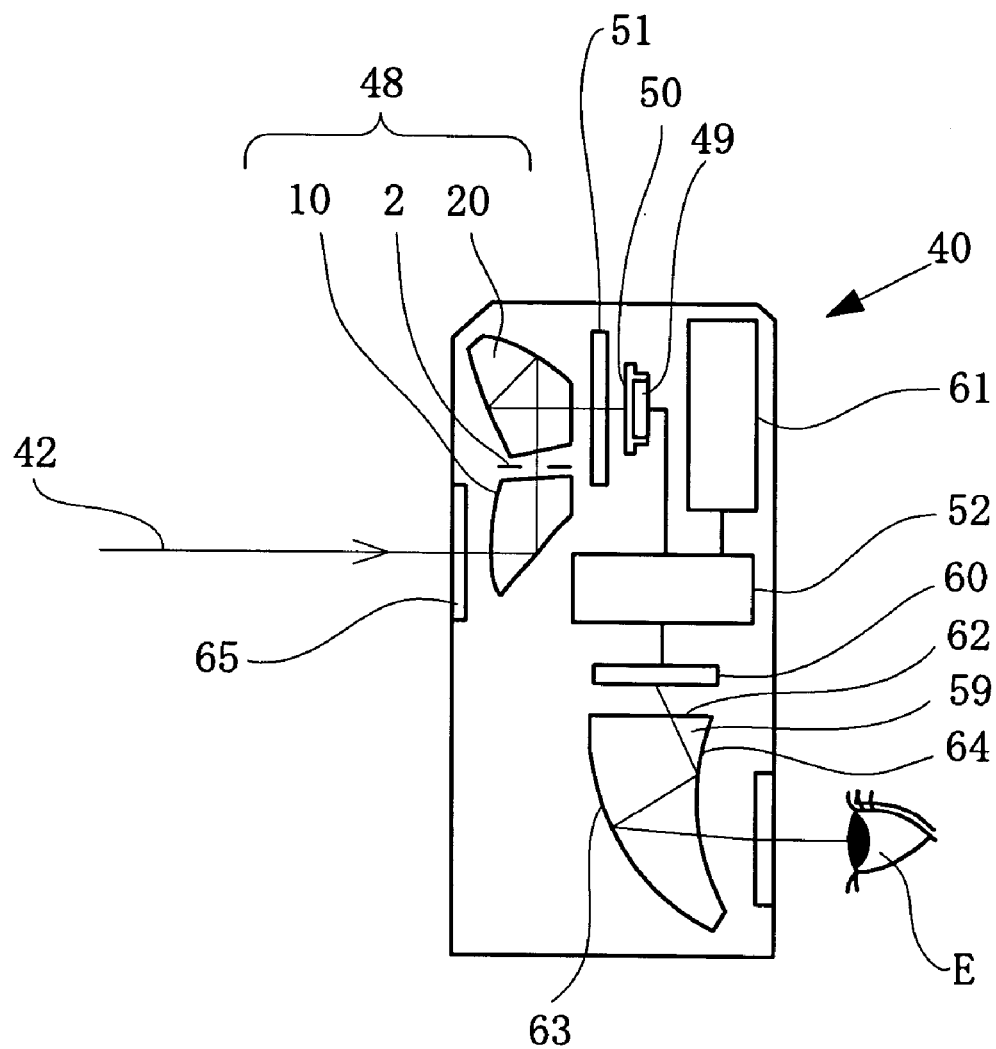
FIG. 19 is a conceptual diagram showing another electronic camera which uses the optical system to which the holding structure of the present invention is applicable.

Next, FIG. 19 is a conceptual diagram showing composition such that the optical system to which the holding structure of the present invention can be applied is built in an objective optical system 48 of the photographing section of an electronic camera 40. In this case, the optical system according to the present invention is used for the objective optical system 48 for photographing arranged on an optical path 42 for photographing. The objective optical system 48 for photographing consists of the first prism 10, an aperture stop 2, and the second prism 20. An object image formed of this objective optical system 48 for photographing is formed on an image pickup surface 50 of CCD 49 through a filter 51, such as a low pass filter, an infrared cut filter and the like. An object image received by this CCD 49 is displayed as an electronic image on a liquid crystal display element (LCD) 60 through a processing means 52. Moreover, this processing means 52 also performs control of a record means 61. This record means 61 records the object image photographed by CCD 49 as electronic information. The picture displayed on LCD 60 is led to an observer eyeball E through an eyepiece system 59. This eyepiece system 59 consists of a decentering prism, In this example, it is composed with three surfaces which are an entrance surface 62, a reflecting surface 63, and a surface 64 which can be used for reflection and refraction. Moreover, at least, one of two surfaces 63 and 64 having reflecting function, preferably, both of the surfaces are composed with sculptured surface(free curved surface) which gives power to a light flux and correct a decentering aberration. Moreover, these sculptured surfaces are sculptured surfaces that is plane symmetry, which has sole symmetric surface. And, this sole symmetric surface is formed on almost nearly the same plane with the sole symmetric surface of the plane symmetry sculptured surface which the prisms 10 and 20 of the objective optical system 48 for photographing have. Moreover, this objective optical system 48 for photographing may contain other lenses (positive lens, negative lens) at the object side of the prisms 10 and 20, and between the prisms, or at the image side, as composition elements.

In the camera 40 composed in this way, the objective optical system 48 for photographing can be composed with a small number of optical component and high efficiency and cost reduction can be realized. Furthermore, whole optical system can be arranged side by side on the same plane. Therefore, thinning of a thickness in a perpendicular direction to this arrangement plane can be achieved.

In this example, a plane-parallel plate is arranged as a cover component 65 of the objective optical system 48 for photographing. However, a lens having power can be used like the example mentioned above.

Here, a surface arranged at the nearest position of the object side in the optical system of the present invention can also be used as a cover component instead of arranging the cover component.

In this example, the surface at the nearest position of the object side is an entrance surface of the first prism 10. However, since this entrance surface is arranged eccentrically to the optical axis, if this surface is arranged in front of the camera, one has an illusion as if the photographing center of the camera 40 has shifted from itself (as same as the case of a common camera, usually one feels that a photographing is performed in the perpendicular direction to an entrance surface ), and sense of incongruity will be given when one observes from the photographed object side. In case like this example that the surface at the nearest side of an object is a decentering surface, it is desirable that a cover component 65 (or cover lens 54) is arranged, because photographing can be performed with the same feeling when using a conventional camera, without having feeling sense of incongruity when one observes it from the photographed object side.

Next, FIG. 20 shows a conceptual diagrams of composition, where an optical system to which the holding structure of the present invention can be applicable is built in an objective optical system 82 of the observation system of an electronic endoscope, and the optical system to which the holding structure of the present invention can be applicable is built in an eyepiece optical system 87 of the observation system of the electronic endoscope.

Figure 20A:
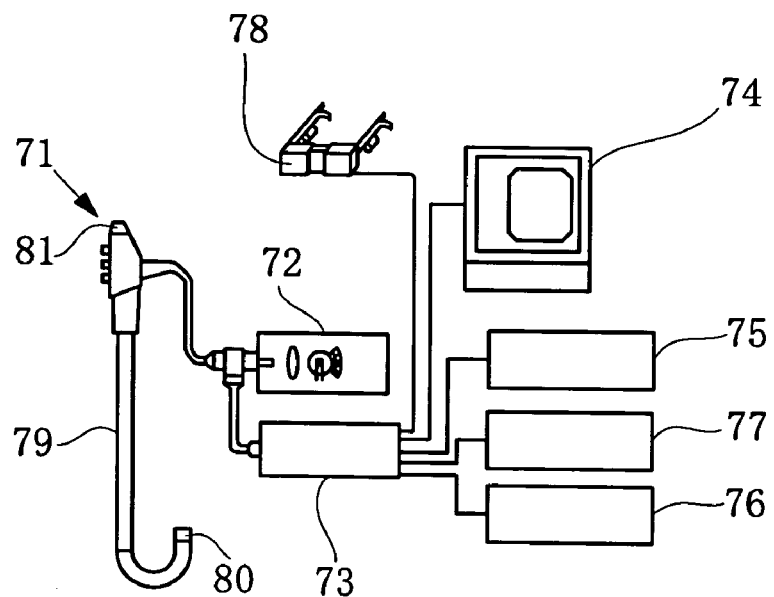
FIG. 20A is a conceptual diagram of another electronic camera which uses the optical system to which the holding structure of the present invention is applicable.

As shown in FIG. 20A, this electronic endoscope is composed of an electronic endoscope 71, a light source apparatus 72, a video processor 73, a monitor 74, VTR deck 75 and a video disk 76, a video printer 77, and a head mounting type image display apparatus (HMD) 78.

The light source apparatus 72 supplies illuminating light. The video processor 73 performs signal processing corresponding to the electronic endoscope 71. The monitor 74 displays a picture signal output from the video processor 73. The VTR deck 75 is connected with video processor 73, for recording the picture signal etc. The video printer 77 prints out the picture signal as an image.

Figure 20B:
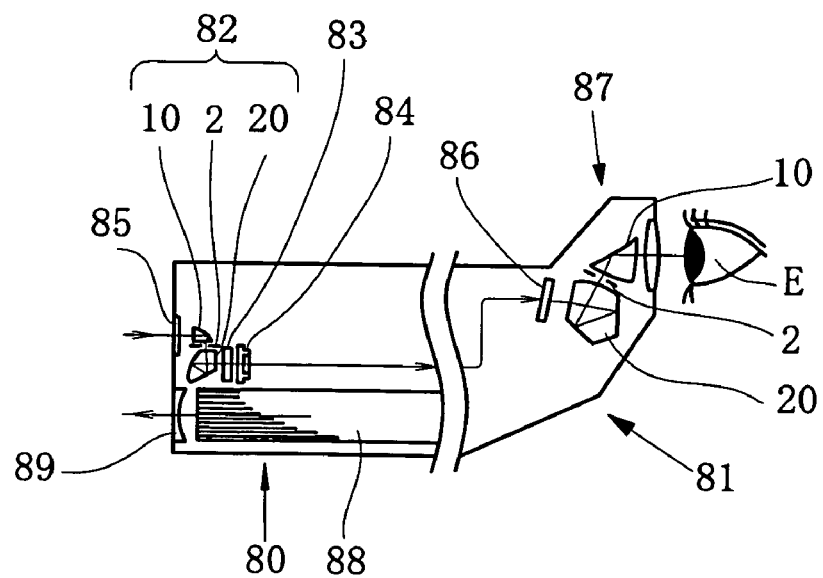
FIG. 20B is a sectional diagram showing a tip part of an insertion part of an electronic endoscope and an eyepiece portion shown in FIG. 20A.

Moreover, a tip portion 80 and an eyepiece portion 81 of an insertion portion 79 of the electronic endoscope 71 are composed as shown in FIG. 20B. Light flux illuminated from the light source apparatus 72 illuminates an observation portion by an objective optical system 89 for illuminating through a light guide fiber bundle 88. Then, the light from this observation portion is formed as an object image of the objective optical system 82 for observation through a cover component 85. This object image is formed on the image pickup surface of CCD 84 through a filter 83 such as a low pass filter, an infrared cut filter, etc. Furthermore, this object image is converted a picture signal by CCD 84, and the picture signal is directly displayed on the monitor 74, while it is recorded in the VTR deck 75 and the video disk 76 by the video processor 73 shown in FIG. 20A. Moreover, it is printed out as an image from the video printer 77. Moreover, the object image is displayed on an image display element of HMD 78, and is displayed to a person mounting HMD 78. At the same time, the picture signal converted by CCD 84 is displayed as an electronic image on the liquid-crystal-display element (LCD) 86 of the eyepiece portion 81. Then, the displayed image is led to the observer's eyeball E through the eyepiece system 87 using the optical system according to the present invention.

In the endoscope composed in this way, it can be composed with a small number of optical component, and high efficiency and cost reduction can be realized. Furthermore, as the objective optical system 80 is arranged along a line in the transverse direction of the endoscope, the above-mentioned effect can be obtained without hindering of thinning of diameter.

Figure 21:
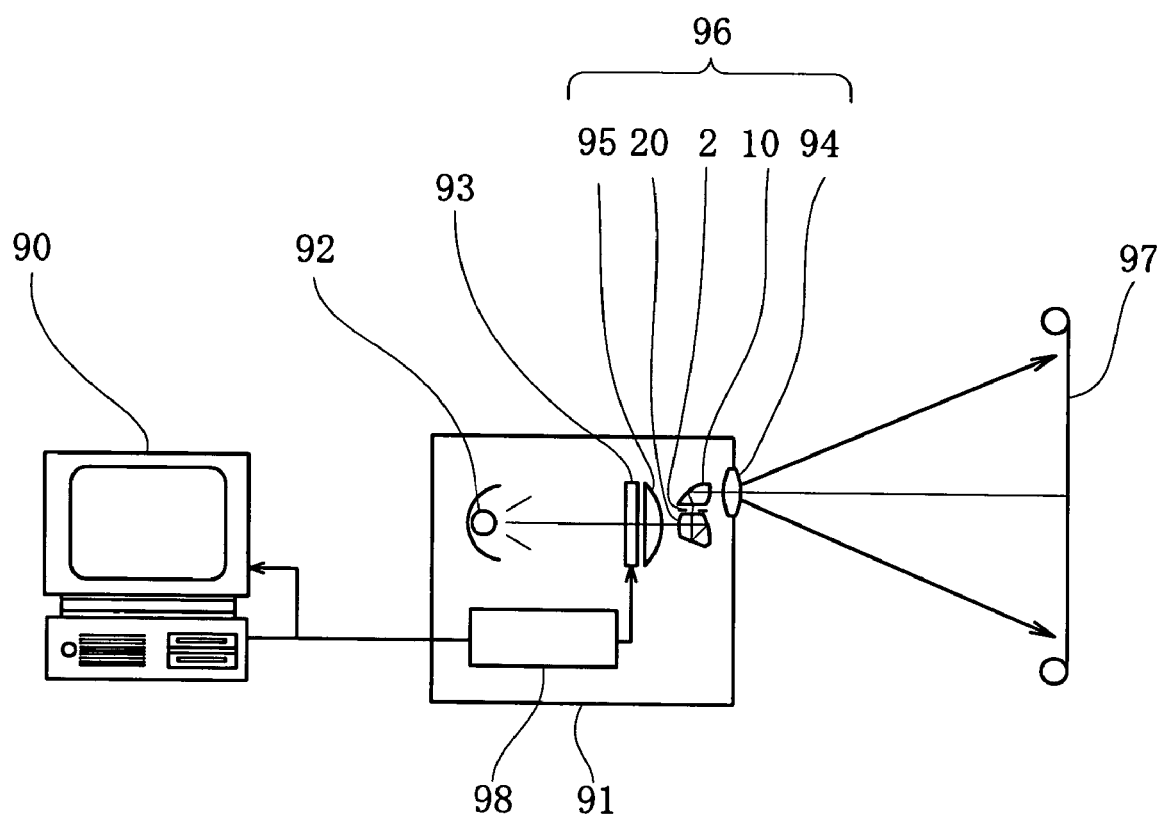
FIG. 21 is a conceptual diagram of the composition using the optical system to which the holding structure of the present invention is applicable, to a projecting optical system of a presentation system.

By the way, the optical system can be used also as a projecting optical system by making the optical path reverse. FIG. 21 shows a presentation system in which a personal computer 90 and a liquid crystal display projector 91 are combined. Here, a composition using the prism optical system according to the present invention as the projecting optical system 96 is shown. In case of this example, the projecting optical system 96 consists of a first prism 10, an aperture stop 2 and a second prism 20. In this diagram, a picture and manuscript produced on the personal computer 90 are branched from a monitor output, and then output to a processing control portion 98 of a liquid crystal display projector 91. In the processing control portion 98 of the liquid crystal display projector 91, this input data is processed and it is output to a liquid crystal panel (LCP) 93. In the liquid crystal panel 93, a picture corresponding to this input image data is displayed. As for the light from a light source 92, the amount of penetration of it is determined by gradation of the picture displayed on the liquid crystal panel 93. Then, it is projected on a screen 97 through a field lens 95 arranged just before the liquid crystal panel 93, the first prism 10, then aperture stop 2 and the second prism 20, and a cover lens 94 of a positive lens.

In the endoscope composed in this way, it can be composed with a small number of optical components, and high efficiency, cost reduction as well as miniaturization can be realized.

Figure 22:
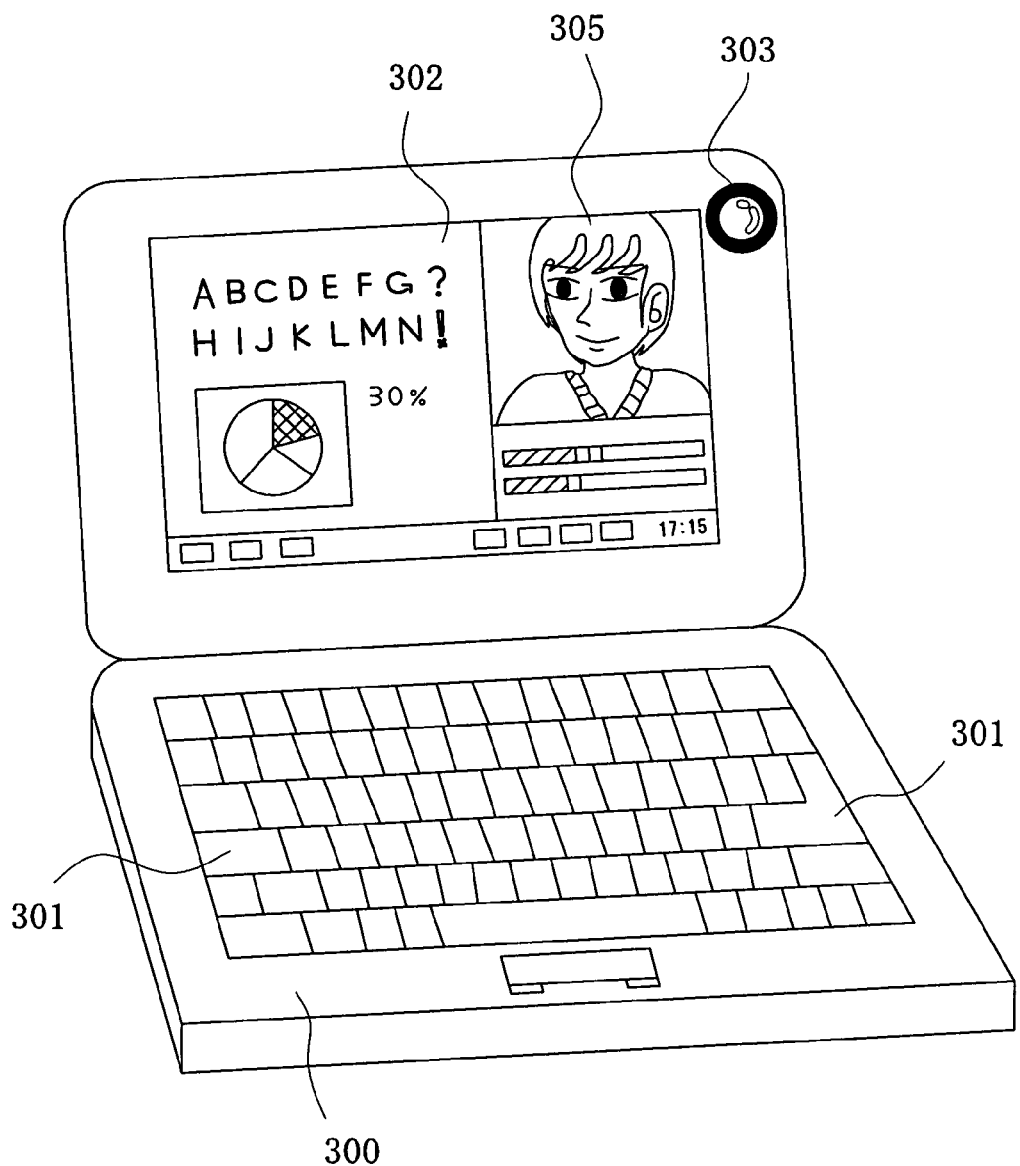
FIG. 22 is a front perspective diagram showing a personal computer which an optical system to which a holding structure of the present invention is applicable as an objective optical system is built in, wherein a cover of the personal computer is opened.
Figure 23:
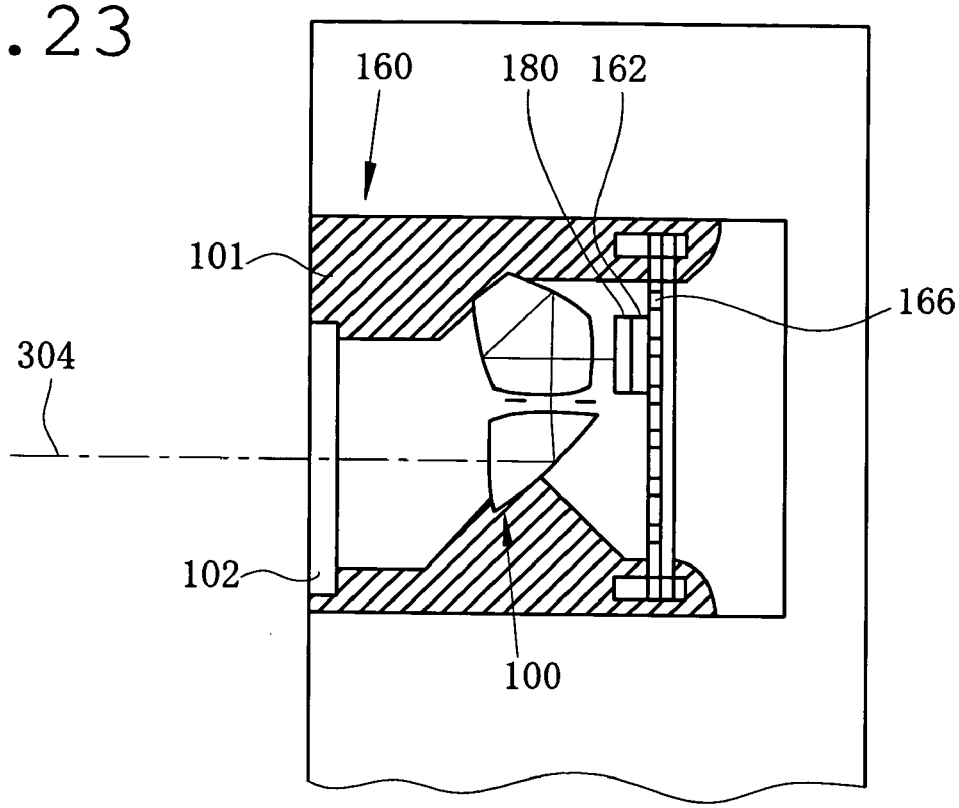
FIG. 23 is a sectional view of a photographing optical system of the personal computer.
Figure 24:
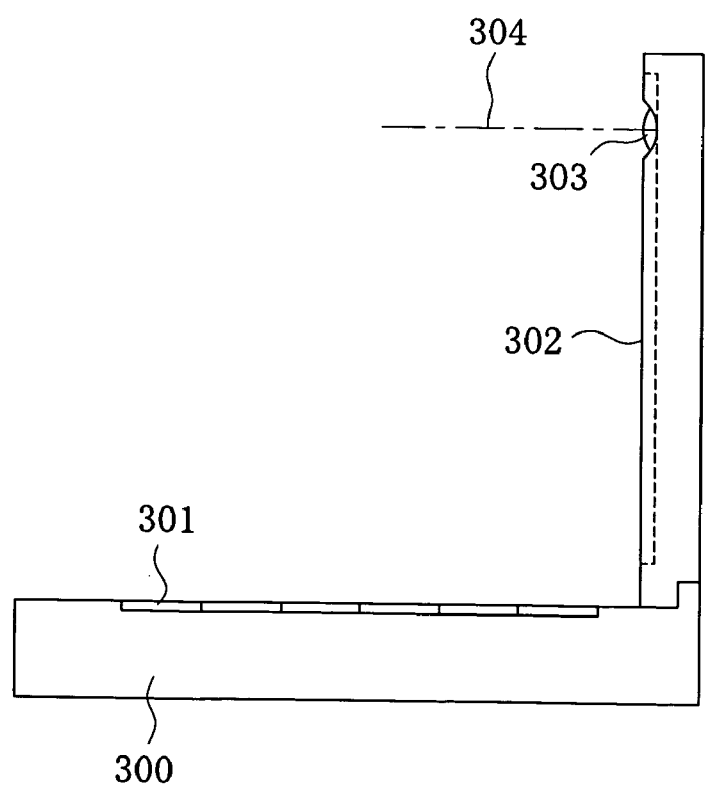
FIG. 24 is a side elevation of the state in the FIG. 22.

As shown in FIGS. 22 to 24, the personal computer has a keyboard 301 for an operator to input information from the exterior, an information-processing means and a record means, an illustration of which has been omitted, a monitor 302, and a photographing optical system 303.

Information is input to the keyboard 301 from the exterior by an operator. The monitor 302 displays the information to the operator. The photographing optical system 303 is for taking photograph of the operator himself and a surrounding image. Here, the monitor 302 can be a penetrated type liquid crystal display element illuminated from the backward by the back light which has not been illustrated here. It can be a reflective type liquid crystal display element which displays by reflecting the light from frontward, CRT display, etc.

In these drawings, although the photographing optical system 303 is built in upper right portion of the monitor 302, it may be arranged at not only the place mentioned above but also any portion around the monitor 302 and around the keyboard 301.

This photographing optical system 303 has an objective optical system 100 composed by the optical system according to the present and an image pickup element chip 162 for receiving an image, on the photographing optical path 304. These are built in the personal computer 300.

Here, on the image pickup element chip 162, a IR cut filter 18 is stuck additionally, which is formed in one as an imaging unit 160. The imaging unit 160 is inserted in the back edge of a lens holding frame 101 of the objective optical system 100 by one-touch action, and attaching becomes possible. Thus, centering of the optical system 100 and the image pickup element chip 162, and adjustment of distance between surfaces are unnecessary, and assembling becomes simple. Moreover, a cover glass 102 is arranged at the tip (illustration has been omitted) of the lens holding frame 101. This cover glass 102 is for protecting the objective optical system.

An object image received by the image pickup element chip 162 is input via a terminal 166 into a processing means of the personal computer 300, and it is displayed on the monitor 302 as an electronic picture. In FIG. 23, a picture 305 in which an operator has been photographed is shown as an example. This picture 305 can be displayed, through a processing means, on a personal computer of a communication partner from a remote place through Internet or telephone.

Next, as another example of the information processing equipment, a telephone, particularly a cellular phone that is convenient to carry, where an optical system which the holding structure according to the present invention is applicable is built in is shown in FIG. 25.

Figure 25A:
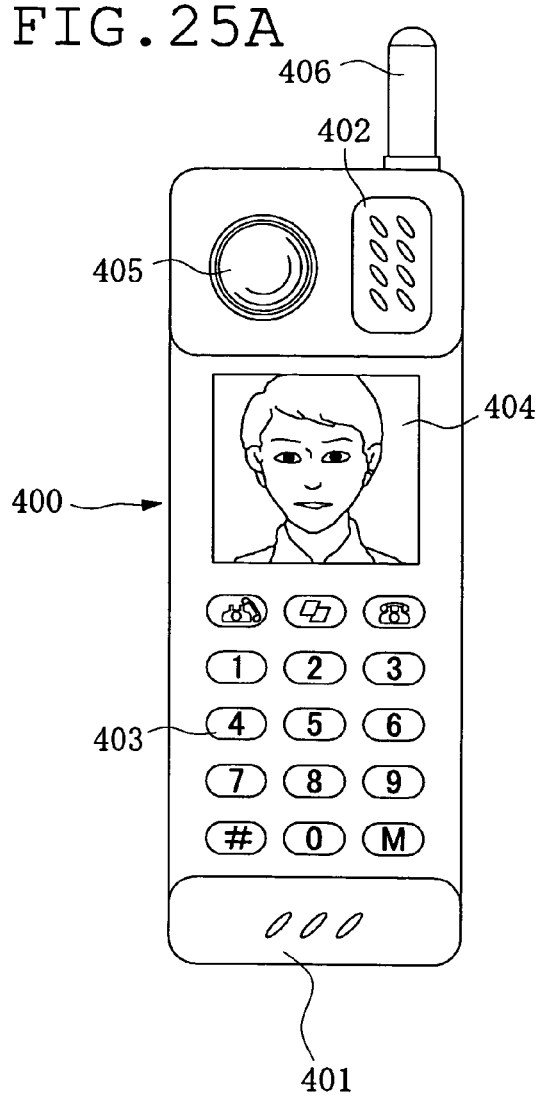
FIGS. 25A, 25B, and 25C are a front view and a side view showing a cellular phone incorporating with an optical system to which a holding structure of the present invention is applicable, and a sectional diagram showing its photographing optical system.
Figure 25B:
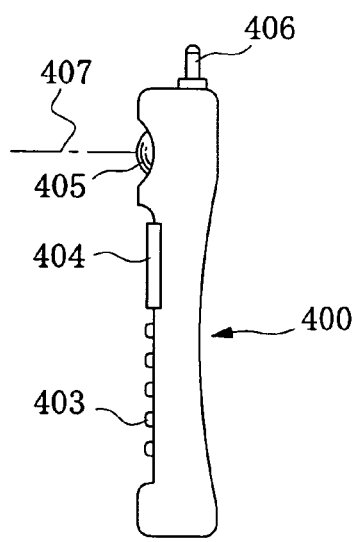
Figure 25C:
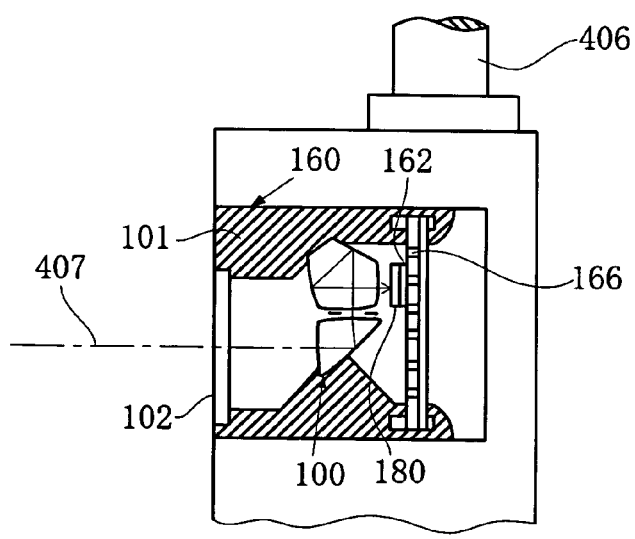

FIG. 25A is a front view of a cellular phone 400, FIG. 25B is a side view of the same and FIG. 25C is a sectional view of a photographing optical system 400.

As shown in FIGS. 25A to 25C, a cellular phone 400 has a microphone section 401, a speaker section 402, an input dial 403, a monitor 404, a photographing optical system 405, an antenna 406 which performs transmission and receiving a communication electric wave, and a processing means (not shown). The microphone section 401 is for inputting an operator's voice as information, the speaker section 402 is for outputting a partner's voice of telephone communication, the input dial 403 is for the operator inputting information, the monitor 404 displays information, such as a photographed picture of the operator-self, a partner of telephone communication etc., and a telephone number. Here, the monitor 404 is a liquid crystal display element. The antenna 406 is for transmitting and receiving a communication electric wave, and the processing means is for processing picture information, communication information, an incoming signal, etc.

In these drawings, an arrangement position of each composition is not restricted particularly to these mentioned above.

This photographing optical system 405 has the objective optical system 100 arranged on the photographing optical path 407 and the image pickup element chip 162 which receives a light of an image.

The optical system of the present invention is used for the objective optical system 100.

These are built in the cellular phone 400.

Here, on the image pickup element chip 162, the IR cut filter 180 is stuck additionally, which is formed in one as an imaging unit 160. The imaging unit 160 is inserted in the back edge of a lens holding frame 101 of the objective lens by one-touch action, and attaching becomes possible. Thus, centering of the objective lens and the image pickup element chip 162, and adjustment of distance between surfaces are unnecessary, and assembling becomes simple. Moreover, a cover glass 102 for protecting the objective optical system 100 is arranged at the tip of the lens holding frame 101.

An object image received by the photographing element chip 162 is input into a processing means, which has not been illustrated, through the terminal 166. Then, it is displayed, as an electronic picture, on the monitor 404, a monitor of a communication partner or both of them. When transmitting an image to the communication partner, the signal-processing function to convert a data on the object image received by the image pickup element chip 162 into a signal which can be transmitted is included in the processing means.

What is claimed is:

1. An image pickup apparatus comprising, one holding component which holds two or more prisms and an image pickup element,
   wherein the holding component has a first plate-shaped portion and a second plate-shaped portion,
   wherein the image pickup element is held on a front surface of the first plate-shaped portion,
   wherein the prisms are held with the second plate-shaped portion being interposed between, and
   wherein the second plate-shaped portion is constructed to protrude from the front surface of the first plate-shaped portion at a position where the prisms face the front surface of the first plate-shaped portion.

2. An image pickup apparatus comprising, a prism holding component which holds two or more prisms, and an image pickup element holding component which holds an image pickup element,
   wherein the image pickup element is held on a front surface of the image pickup element holding component,
   wherein the prisms are held with the prism holding component being interposed between, and
   wherein the prism holding component is constructed to protrude from the front surface of the image pickup element holding component at a position where the prisms face the front surface of the image pickup element holding component.

3. An image pickup apparatus comprising, a prism holding component which holds two or more prisms, and an image pickup element holding component which holds an image pickup element, wherein the prism holding component is constructed to be movable relative to the image pickup element holding component.

4. An image pickup apparatus according to claim 2, wherein the prism holding component and the image pickup element holding component are integrally formed.

5. An image pickup apparatus according to claim 2, wherein the prism holding component is fixed at a predetermined position of the image pickup element holding component.

6. An image pickup apparatus according to claim 3, wherein a movable frame is formed integrally with the prism holding component, and a holding shaft is formed integrally with the image pickup element holding component and holds the prism holding component in such a manner that the prism holding component is movable, via the movable frame, along a direction of light incident on the image pickup element.

7. An image pickup apparatus according to claim 6, wherein the movable frame is formed on one side of the prism holding component, at a position where the movable frame is free from facing toward an entrance surface of the image pickup element.

8. An image pickup apparatus according to claim 2, wherein the prism holding component has an aperture stop function.

9. A holding structure for image pickup optical members, wherein by using a holding component having a prism holding portion and an image pickup element holding portion located on an exit light path of a prism, two or more prisms are held on the prism holding portion as facing one another, and an image pickup element is held on the image pickup element holding portion.

10. A holding structure for image pickup optical members according to claim 9, wherein the prism holding portion is constructed to be movable relative to the image pickup element holding portion.

11. A holding structure for image pickup optical members according to claim 9, wherein the prism holding portion and the image pickup element holding portion are integrally formed.

12. A holding structure for image pickup optical members according to claim 9, wherein the prism holding portion is fixed upon positioning in reference to the image pickup element holding portion being made.

13. A holding structure for image pickup optical members according to claim 9, wherein the prism holding portion has an aperture stop function.

14. An image pickup apparatus according to claim 1, wherein each of the two or more prisms is composed of a prism which has an entrance surface, at least one rotationally asymmetric reflecting surface and an exit surface.

15. A holding structure for image pickup optical members according to claim 9, wherein each of the two or more prisms is composed of a prism which has an entrance surface, at least one rotationally asymmetric reflecting surface and an exit surface.

16. An image pickup apparatus according to claim 6, wherein the prism holding component has an aperture stop function.

17. An image pickup apparatus according to claim 7, wherein the prism holding component has an aperture stop function.

* * * * *